United States Patent Office 3,119,788
Patented Jan. 28, 1964

3,119,788
DIALKYL ESTERS OF 2,5-DIPHENYLADIPIC ACID
John F. Nobis and Charles E. Frank, Cincinnati, Ohio, assignors to National Distillers and Chemical Corporation, New York, N.Y., a corporation of Virginia
No Drawing. Filed Jan. 17, 1958, Ser. No. 709,482
4 Claims. (Cl. 260—475)

The present invention relates broadly to a new class of esters and, particularly, to such esters of 2,5-diphenyladipic acid.

More specifically, the invention relates to dialkyl esters of 2,5-diphenyladipic acid and, especially such esters in which the alkyl groups contain from one to eighteen carbon atoms and, still more preferably, from one to twelve carbon atoms. Specific examples thereof include dimethyl-2,5-diphenyladipate, di-2-ethylbutyl-2,5-diphenyladipate, di-isoamyl-2,5-diphenyladipate, di-n-amyl-2,5-diphenyladipate, di-n-octyl-2,5-diphenyladipate, diethyl-2,5-diphenyladipate, di-2-ethylhexyl-2,5-diphenyladipate, di-isobutyl - 2,5 - diphenyladipate, di-2-methylpentyl-2,5-diphenyladipate, di-decyl-2,5-diphenyladipate, and others.

The novel class of esters embodied herein can be prepared by conventional esterification and/or transesterification reactions with a suitable monohydric alcohol or combination of such alcohols, with or without an esterification catalyst. The preferred method involves refluxing about one mole of the 2,5-diphenyladipic acid with at least two moles of a suitable alcohol and, preferably, from about 2 to about 2.5 moles of the alcohol although a higher excess of the alcohol can be used if desired. Moreover, a diluent such as an inert solvent (e.g., benzene, toluene, xylene, perchloroethylene, etc.) can be used, when convenient, for lowering the reflux temperature. Generally, the resulting ester is then washed to remove residual acid, if any, and subjected to distillation at reduced pressure (e.g., about 1 mm.) to remove excess alcohol and moisture. Alternatively, the desired ester may be made by ester interchange in which an alcohol group of an ester is utilized for interchange with the alcohol portion of an ester of 2,5-diphenyladipic acid.

The following examples will serve to illustrate embodiments of the invention, although it should be understood that the invention is not limited thereto. In the described embodiments, the quantitative proportions referred to are expressed on a weight basis unless expressly indicated otherwise. Wtih reference to the diphenyladipic acid reactant, such a reactant was 2,5-diphenyladipic acid, as a mixture of its meso and reacemic forms, having a neutral equivalent of 150 (theory=149) and a melting point of 203–241° C.

The 2,5-diphenyladipic acid was prepared in accordance with the process of U.S. Patent No. 2,816,913 by initially reacting styrene with finely divided sodium to form the disodio dimer of styrene, followed by carbonation of the disodio dimers to form the disodio salt of 2,5-diphenyladipic acid and neutralization of the salt with mineral acid to liberate the 2,5-diphenyladipic acid as a mixture of its meso and racemic forms.

EXAMPLE 1

A mixture of 149 grams (0.5 mol) of 2,5-diphenyladipic acid and 143 grams (1.1 mols) of 2-ethylhexanol was charged into a 500 ml. round-bottomed flask fiitted with a stirrer, thermometer, Dean and Stark receiver and reflux condenser. The temperature of the flask contents was heated to 165° C. and then allowed to increase to 195° C. as the free water was removed as a distillate until an acid number of 5.0 was reached which required a period of four hours. The reaction mixture was then filtered to provide the fluid di-2-ethylhexyl ester of 2,5-diphenyladipic acid. Elemental analysis of such a product gave the following results:

Found:
C _____ 77.95
H _____ 9.35
Theory:
C _____ 78.16
H _____ 9.58

EXAMPLE 2

A mixture of 298 grams (1.0 mol) of 2,5-diphenyladipic acid and 2 ml. concentrated sulfuric acid was charged into a 500 ml. round-bottom flask and the temperature raised to 225° C. Methanol was passed through the molten acid from a distillation column while the methanol-water distillate product of reaction was separated and the methanol returned to the flask. The crude ester product was crystallized from methanol to provide crystals of the dimethyl ester of 2,5-diphenyladipic acid having a melting range of 124–134° C. The meso form of the ester had a melting point of 136–137° C. and the racemic form had a melting point of 124–126° C.

EXAMPLE 3

One hundred grams of 2,5-diphenyladipic acid, 2 grams of p-toluenesulfonic acid and 200 cc. methanol were charged to a reactor and the temperature raised to 71° C. to obtain complete solution of the reactants and esterification was carried out with continuous removal of distillate (water-methanol) with fractionation of the distillate and return of the methanol to the reactor. The crude ester product was crystallized from methanol to yield a product having a melting point of 125–132° C. Elemental analysis for the resulting dimethyl ester was as follows:

Found:
C _____ 73.7
H _____ 6.77
Theory:
C _____ 73.6
H _____ 6.75

EXAMPLE 4

One liter of absolute ethanol and 175 grams of 2,5-diphenyladipic acid were mixed and filtered to remove insoluble material. The solution was then concentrated to 400–500 cc. and diluted with 100 cc. of benzene, 25 grams of p-toluenesulfonic acid was added and the solution heated to boiling with removal of water by azeotropic distillation. The benzene and excess alcohol were then distilled off and the residue taken up in an equal volume of absolute alcohol, treated with carbon (Darco) and filtered. On cooling and filtering, the diethyl ester of 2,5-diphenyladipic acid was obtained having a melting point of 108–109° C.

EXAMPLE 5

The following material was charged to a round-bottom flask fitted with a thermometer, stirrer, a $CO_2$ gas inlet, reflux condenser and Dean-Stark receiver: 149 grams (0.5 mole) 2,5-diphenyladipic acid, 92.5 grams (1.25 moles) of isobutyl alcohol, 200 cc. of xylene; and 1.5 grams of p-toluene sulfonic acid. The mixture was heated for three hours at a maximum temperature of 140° C. with the water of reaction being removed by azeotropic distillation. The crude reaction product in xylene solution was washed with 10% $Na_2CO_3$ solution to remove catalyst and the xylene and excess alcohol were removed by distillation. The crude solid was recrystallized from cold methanol to provide the solid diisobutyl-2,5-diphenyladipate having a melting range of 78–84° C.

EXAMPLE 6

The following materials were charged to a one liter round-bottom flask: 298 grams (1 mole) of 2,5-diphenyladipic acid, 306 grams (3 moles) of 2-methylpentanol, 3.0 grams of p-toluenesulfonic acid, and 100 cc. of xylene to remove water of reaction as an azeotrope. The flask was equipped with a stirrer, reflux condenser, Dean and Stark receiver, thermometer, and $CO_2$ gas inlet. The mixture was heated for 1.5 hours at a maximum reactor temperature of 150° C. The ester product in xylene solution was washed with 10% $Na_2CO_3$ solution to remove catalyst and excess alcohol and xylene was removed by distillation. The crude ester was recrystallized from cold methanol to provide the white crystalline ester di-2-methylpentyl-2,5-diphenyladipate having a melting range of 54–64° C.

By following esterification procedures such as utilized in the foregoing examples, 2,5-diphenyladipic acid was esterified with 2-ethylbutanol to produce the fluid di-(2-ethylbutyl)-2,5-diphenyladipate, and with isoamyl alcohol to produce the fluid di-isoamyl-2,5-diphenyladipate.

Dialkyl esters of 2,5-diphenyladipic acid possess an unusual combination of outstanding properties for plasticizing resins such as polyvinyl chloride, polyvinyl acetate, and copolymers thereof such as in resins of coating grade and calendered stock. Although certain esters are conventionally utilized for such a purpose, they generally are either aliphatic esters of aliphatic acids or of aromatic acids, e.g., di-2-ethylhexyladipate and dioctyl phthalate, each of which possess certain advantages but are not entirely satisfactory. The esters embodied herein are superior to esters of aromatic acids or aliphatic acids or any combination thereof since, in the esters embodied herein, aromatic groups are attached to an aliphatic chain and the advantages of both aliphatic esters and aromatic esters are combined in one molecule. In addition, the esters of 2,5-diphenyladipic acid may be used as mixtures with the other esters such as phthalates or adipates, sebacates, azelates, etc., to provide mixtures of improved properties as viscosity stabilizers for vinyl resins.

Furthermore, the esters of 2,5-diphenyladipic acid are useful in the preparation of plant growth stimulants (as chlorinated derivatives), as pesticides, as lubricants of exceptional high temperature stability and as radiation resistant lubricants and for plasticizing resins to provide plasticized resins of improved resistance to degradation by intense radiation.

For many applications, as in plasticizing vinyl resins such as polyvinyl chloride, and copolymers thereof with, for example, vinyl acetate, it is highly desirable that the plasticizer be relatively non-volatile and substantially non-extractable by soapy water, mineral oils, etc. Thus, dialkyl esters of 2,5-diphenyladipic acid as embodied herein are useful in preparation of organosols in which the ester suspended in or dissolved in an inert volatile carrier (e.g., diisobutyl ketone, xylene) is blended with a vinyl chloride resin to plasticize the resin and provide a plasticized vinyl chloride, or vinyl chloride-vinyl acetate copolymer, that possesses excellent properties such as ultimate tensile strength, is resistant to extraction with soap solutions and mineral oil, and is of extremely low volatility characteristics.

Ester products of 2,5-diphenyladipic acid, as embodied herein, when used as plasticizers for resins, such as polyvinyls, impart to the resulting composition desirable properties due to the 2,5-position of the phenyl groups. Thus, whereas for example, a film of polyvinyl chloride plasticized with di-(2-ethylbutyl)-2,5-diphenyladipate is clear, water-white, transparent and homogenous, the corresponding film using a di-(2-ethylbutyl)-3,4-diphenyladipate is cloudy, white, opaque and non-homogenous with evidence of occurrence of blooming of the plasticizer in the film. Such observations were made by grinding the following compositions in pebble mills for 40 hours to obtain smooth dispersions and ten ml. films prepared by coating the resultant mixture on glass with a drawdown blade and baking the wet films for 20 minutes at 350° F.

| | Parts |
|---|---|
| Polyvinyl chloride resin | 59 |
| Plasticizer | 38 |
| Stabilizer (Paraplex G-62) | 3 |
| | 100 |
| Methyl isobutyl ketone | 12 |
| Toluene | 16 |
| Apco thinner | 12 |

Moreover, the dialkyl esters of 2,5-diphenyladipic acid impart unexpectedly improved mechanical properties to such films, especially when compared to the same film but in which the corresponding diester of 3,4-diphenyladipic acid is used. Thus, as are shown by the following data, the aforesaid compositions plasticized with the di-(2-ethylbutyl)-2,5-diphenyladipate gave a higher elongation value and lower 100% modulus value, as compared to the same film but which was plasticized with the corresponding diester of 3,4-diphenyladipic acid. Such data clearly illustrates the marked, unexpected superiority as a plasticizer of the diester of the 2,5-diphenyladipic acid over the corresponding diester of the 3,4-diphenyladipic acid.

| Plasticizer | 100% Modulus | Percent Elongation | Ultimate Tensile Strength |
|---|---|---|---|
| Di-(2-ethylbutyl)-2,5-diphenyladipate | 1,490 | 360 | 2,850 |
| Di-(2-ethylbutyl)-3,4-diphenyladipate | 1,614 | 100 | 1,614 |

The dialkyl esters of 2,5-diphenyladipic acid also exhibit superior properties as viscosity stabilizers for vinyl resins as well as to improve the viscosity characteristics of compositions that contain other plasticizers. In illustration, compositions were prepared by dispersing 100 parts of a vinyl chloride resin in 65 parts of plasticizer. In one case, the plasticizer was di-(2-ethylhexyl phthalate); in another case, the plasticizer was di-(2-ethylbutyl)-2,5-diphenyladipate; in another case, the plasticizer was a mixture of 25% di-(2-methylpentyl)-2,5-diphenyladipate and 75% di-(2-ethylhexyl) phthalate. The results obtained showing the improved stability imparted by the diesters of 2,5-diphenyladipic acid are shown in the following tabulations I and II.

*Table I* [1]

BROOKFIELD VISCOSITIES

| Storage Time | Plasticizers | | | |
|---|---|---|---|---|
| | Di(2 Ethylhexyl) Phthalate— Spindle #5 | | Di(2 Ethylbutyl) 2,5-Diphenyladipate—Spindle #5 | |
| | R.p.m. | Cps. | R.p.m. | Cps. |
| Initial Viscosity | 20 | 8,000 | 20 | [2] 20,000 |
| | 10 | 9,800 | 10 | 25,000 |
| | 4 | 13,200 | 4 | 27,800 |
| | 2 | 16,400 | 2 | 33,500 |
| One Day | 20 | 10,200 | 20 | [2] 20,000 |
| | 10 | 14,600 | 10 | 24,600 |
| | 4 | 19,000 | 4 | 25,800 |
| | 2 | 24,500 | 2 | 28,000 |
| Seven Days | 20 | 14,100 | 20 | [2] 20,000 |
| | 10 | 18,500 | 10 | 19,500 |
| | 4 | 27,000 | 4 | 20,300 |
| | 2 | 34,000 | 2 | 22,100 |
| Fourteen Days | 20 | 13,600 | 20 | [2] 20,000 |
| | 10 | 16,200 | 10 | 20,600 |
| | 4 | 21,800 | 4 | 19,100 |
| | 2 | 29,300 | 2 | 20,600 |
| Twenty-one Days | 20 | 14,900 | 20 | [2] 20,000 |
| | 10 | 19,800 | 10 | 17,500 |
| | 4 | 26,400 | 4 | 16,000 |
| | 2 | 34,000 | 2 | 17,600 |
| Twenty-eight Days | 20 | 15,800 | 20 | [2] 20,000 |
| | 10 | 18,600 | 10 | 18,200 |
| | 4 | 24,500 | 4 | 16,100 |
| | 2 | 30,800 | 2 | 17,600 |
| Thirty-five Days | 20 | [2] 20,000 | 20 | [2] 20,000 |
| | 10 | 23,600 | 10 | 22,800 |
| | 4 | 29,400 | 4 | 19,400 |
| | 2 | 38,000 | 2 | 21,000 |

[1] The compositions for which data are shown in this table contain 5% of a stabilizer (Paraplex G-62).
[2] Off scale.

*Table II* [1]

BROOKFIELD VISCOSITY

| Storage Time | Plasticizers | | | |
|---|---|---|---|---|
| | Di(2 Ethylhexyl) Phthalate— Spindle #4 | | 25% Di(2 Methylpentyl) 2,5 Diphenyladipate; 75% Di(2 Ethylhexyl) Phthalate— Spindle #6 | |
| | R.p.m. | Cps. | R.p.m. | Cps. |
| Initial Viscosity | 20 | 8,800 | 20 | [2] 50,000 |
| | 10 | 10,600 | 10 | 79,400 |
| | 4 | 14,000 | 4 | 138,000 |
| | 2 | 18,600 | 2 | 198,000 |
| One Day | 20 | [2] 10,000 | 20 | 46,000 |
| | 10 | 18,300 | 10 | 62,000 |
| | 4 | 25,400 | 4 | 99,000 |
| | 2 | 34,600 | 2 | 143,000 |
| Two Days | 20 | [2] 10,000 | | |
| | 10 | 19,000 | | |
| | 4 | 27,500 | | |
| | 2 | 37,900 | | |
| Seven Days | 20 | [2] 10,000 | 20 | [2] 50,000 |
| | 10 | [2] 20,000 | 10 | 86,000 |
| | 4 | 39,200 | 4 | 124,200 |
| | 2 | 54,300 | 2 | 180,000 |

Spindle #5

| Ten Days | 20 | [2] 20,000 | 20 | [2] 50,000 |
|---|---|---|---|---|
| | 10 | 30,500 | 10 | 91,000 |
| | 4 | 46,300 | 4 | 130,000 |
| | 2 | 58,000 | 2 | 190,000 |
| Fourteen Days | 20 | [2] 20,000 | 20 | [2] 50,000 |
| | 10 | 31,500 | 10 | [2] 100,000 |
| | 4 | 45,000 | 4 | 156,000 |
| | 2 | 63,800 | 2 | 220,000 |

[1] The compositions for which data are shown in this table did not contain a stabilizer.
[2] Off scale.

To further illustrate the excellent performance of esters as embodied herein as plasticizers, diisoamyl 2,5-diphenyladipate was compared with the performance of di-(2-ethylhexyl) phthalate in plasticizing polyvinyl chloride. The compositions consisted of the following in parts by weight:

| | |
|---|---|
| Polyvinylchloride | 100 |
| Plumb-O-Sil B (stabilizer) | 3 |
| Plasticizer | 61.3 |
| Stearic acid (release agent) | 1 |

Such compositions were prepared by premixing the ingredients and then melting on a hot, two-roll mill (maintained at 310° F.) to obtain calendered vinyl films of 70 ml. and 10 ml. thickness. The films were evaluated to determine by a series of standard tests the overall relative merits of the plasticizers in hot processed type vinyl resins. The data from such tests, set forth in Table III, show the utility and superiority of the diesters of 2,5-diphenyladipic acid and, particularly, with respect to heat and light stability in compositions with high resistance to extraction by water, gasoline, and soap solution, and in volatility characteristics.

The dialkyl esters of 2,5-diphenyladipic acid also impart excellent properties to polyvinyl chloride-polyvinyl acetate copolymers as solution grade resins, as illustrated by the following compositions useful, for example, for coating felt back automotive upholstery sheeting.

Di(2-ethylhexyl) 2,5-diphenyladipate was employed as a plasticizer for polyvinyl chloride-acetate copolymers (solution grade resins) at ratio listed in the following formula:

| | |
|---|---|
| Vinylite VYHH | 15.0 |
| Vinylite VMCH | 5.0 |
| Plasticizer | 3.0 |
| Propylene Oxide | 0.2 |
| Methyl Isobutyl Ketone | 38.4 |
| Toluene | 38.4 |
| | 100.0 |

In one case, the plasticizer was di-2-ethylhexyl phthalate; in another it was Paraplex G-50 (an adipic-glycol polyester); and in another case, it was di-(2-ethylhexyl)-2,5-diphenyladipate. The compositions were prepared by adding the polyvinyl copolymers with agitation to a combination of the solvents and plasticizer and then the mix-

Table III
CALENDERED FILM PROPERTIES

| Performance Data | Test Procedure | Plasticizers | |
|---|---|---|---|
| | | Di (2-Ethylhexyl) Phthalate | Diisoamyl 2,5-Diphenyl-adipate |
| 70 mil sheet: | | | |
| Tensile Strength Percent Elongation | A.S.T.M. D412-51T | 2,197 | 2,270. |
| | A.S.T.M. D412-51T | 370 | 330. |
| Heat Stability Test | 2 hrs. at 350° F | Fair | Excellent. |
| Spew Test (Roll) | 3 wks. at 25° C | Slight | Slight. |
| Lacquer Lifting | 3 wks. at 1 p.s.i. pressure | Very Slight Softening. | No Effect. |
| 10 mil sheet: | | | |
| Water Resistance, Percent Extracted | A.S.T.M. D1239-55 7 days at 25° C. | 0.00 | 0.00. |
| Percent Extraction in Gasoline | A.S.T.M. D1239-55 | 19.0 | 10.5. |
| Percent Extraction in Soap Solution | A.S.T.M. D1239-55 24 hrs. at 60° C. | 2.98 | 1.46. |
| Percent Volatility | A.S.T.M. D1203-5 | 2.25 | 0.52. |
| Ultraviolet Light Stability: Hrs. to Failure | Atlas Fade-O-Meter | 200 | 250. | ture was thoroughly dissolved in solution with high speed stirrer. Clear solutions were reduced to coating viscosity (12 seconds in a B Cup at 77° F.) with reducer (50:50 parts by weight of methylethylketone and toluene). Coating of felt back vinyl automotive upholstery sheeting was carried out with a hand gravure coater and the samples were cured for five minutes at 120° F. and then aged for 24 hours before testing.

The series of evaluation test (see Table IV) illustrate the utility and superiority of the 2,5-diphenyladipate as compared to the monomeric di(2-ethylhexyl) phthalate and particularly with respect to improved abrasion resistance, blocking resistance, soap resistance, gasoline resistance and ultraviolet light stability without any substantial decrease in solution concentration at coating viscosity.

Table IV
PROPERTIES OF SOLUTION COATINGS

| Properties | Plasticizers | | |
|---|---|---|---|
| | Di (2 Ethylhexyl) Phthalate | Di (2-Ethylhexyl) 2,5 Diphenyladipate | Paraplex G-50 (Adipic-Glycol Polyester) |
| Color of Solution | Water-White | Water-White | Light Amber. |
| Weight Concentration at Coating Viscosity | 10.0 | 9.7 | 9.0. |
| Abrasion Resistance (Taber Abrader, CS-10 Wheels) Cycles for Failure | 200 | 250 | 250. |
| Blocking Resistance 1 Pound per Square In. Temperature of Blocking | 120° F | 130° F | 130° F. |
| Soap Solution Scrub Test Strokes for Failure | 100 | 175 | 125. |
| Gasoline Spot Test 24 hrs. at 70° F. | Moderate Marking. | Very Slight Marking. | Very Slight Marking. |
| Ultraviolet Light Stability (Atlas Fade-O-Meter) Hours for Failure | 200 | 250 | 240. |

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:
1. A dialkyl ester of 2,5-diphenyladipic acid in which the alkyl groups have from one to twelve carbon atoms.
2. Di-methyl-2,5-diphenyladipate.
3. Di-ethyl-2,5-diphenyladipate.
4. Di-2-ethylhexyl-2,5-diphenyladipate.

References Cited in the file of this patent
UNITED STATES PATENTS

| | | |
|---|---|---|
| 2,634,248 | Dazzi | Apr. 7, 1953 |
| 2,647,917 | Patrick | Aug. 4, 1953 |
| 2,648,652 | Schickh | Aug. 11, 1953 |
| 2,760,972 | Joy | Aug. 28, 1956 |

OTHER REFERENCES

Jensen: Berichte, vol. 39, pp. 4089-90, (1906).
Wren: J. Chem. Soc. (London), 1935, pp. 157-60.
Arata: Chem. Absts., vol. 48, col. 3955, (1954).
McElvain: J.A.C.S., vol. 73, pp. 448-52, (1951).
Knunyants et al.: Chemical Abstracts, vol. 51, col. 14638 (October 1957), (Abstracted from Doklady Akad. Nauk. S.S.S.R., vol. 113, pp. 112-15), 1957.
"Plasticizers," by D. N. Buttrey, pp. 71-75; Kirk-Othmer, Encyclopedia of Chemical Technology, volume 10, pp. 768-769.